(12) United States Patent
Lin et al.

(10) Patent No.: US 6,782,203 B2
(45) Date of Patent: *Aug. 24, 2004

(54) SCALABLE OPTICAL DEMULTIPLEXING ARRANGEMENT FOR WIDE BAND DENSE WAVELENGTH DIVISION MULTIPLEXED SYSTEMS

(75) Inventors: Wenhua Lin, Middletown, NJ (US); Tek-Ming Shen, Westfield, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/143,878

(22) Filed: Aug. 31, 1998

(65) Prior Publication Data

US 2002/0012144 A1 Jan. 31, 2002

(51) Int. Cl.[7] .................................................. H04J 14/02
(52) U.S. Cl. ............................. 398/82; 385/24; 398/68
(58) Field of Search ................................. 359/124, 125, 359/126, 127, 128, 130; 398/79, 80, 81, 82, 86, 87, 88, 68; 385/24

(56) References Cited

U.S. PATENT DOCUMENTS

| | | | | |
|---|---|---|---|---|
| 5,493,625 A | * | 2/1996 | Glance | 385/24 |
| 5,680,490 A | * | 10/1997 | Cohen et al. | 385/24 |
| 5,712,716 A | * | 1/1998 | Vanoli et al. | 359/125 |
| 5,808,763 A | * | 9/1998 | Duck et al. | 359/127 |
| 5,841,919 A | * | 11/1998 | Akiba et al. | 385/37 |
| 5,912,749 A | * | 6/1999 | Harstead et al. | 398/75 |
| 6,052,499 A | * | 4/2000 | Spector | 385/24 |
| 6,094,296 A | * | 7/2000 | Kosaka | 359/341.41 |
| 6,281,997 B1 | * | 8/2001 | Alexander et al. | 359/125 |
| 6,714,702 B2 | * | 3/2004 | Whiteaway et al. | 385/24 |
| 2002/0150329 A1 | * | 10/2002 | Ahn et al. | 385/24 |

* cited by examiner

Primary Examiner—Jason Chan
Assistant Examiner—Christina Y Leung
(74) Attorney, Agent, or Firm—Gregory J. Murgia

(57) ABSTRACT

Substantial reduction in crosstalk and improved scalability for supporting high channel counts in dense wavelength division multiplexed (DWDM) systems is achieved in an optical demultiplexer arrangement that partitions the total number of input optical channels into separate demultiplexer modules, demultiplexes smaller groups of optical channels in the separate demultiplexer modules, and filters the individual optical channels at the outputs of the separate demultiplexer modules. Partitioning the total number of channels into smaller demultiplexing groups and post-filtering a reduced number of demultipexed optical channels reduces the number of non-adjacent channels that can contribute to the total crosstalk level. The modularity of the optical demultiplexer arrangement results in smaller device footprints and smaller free spectral ranges associated with the demultiplexer modules. This modularity also allows for future system upgrades without redesign and without disruption to existing service. In one illustrative embodiment, the optical demultiplexer arrangement includes a splitter or filter for directing the multi-wavelength input optical signal to one or more demultiplexer modules. Each of the demultiplexer modules separates a received multi-wavelength optical signal into individual wavelength channels. The individual wavelength channels are then supplied to bandpass post-filters which are coupled to each of the outputs of the demultiplexer modules.

11 Claims, 8 Drawing Sheets

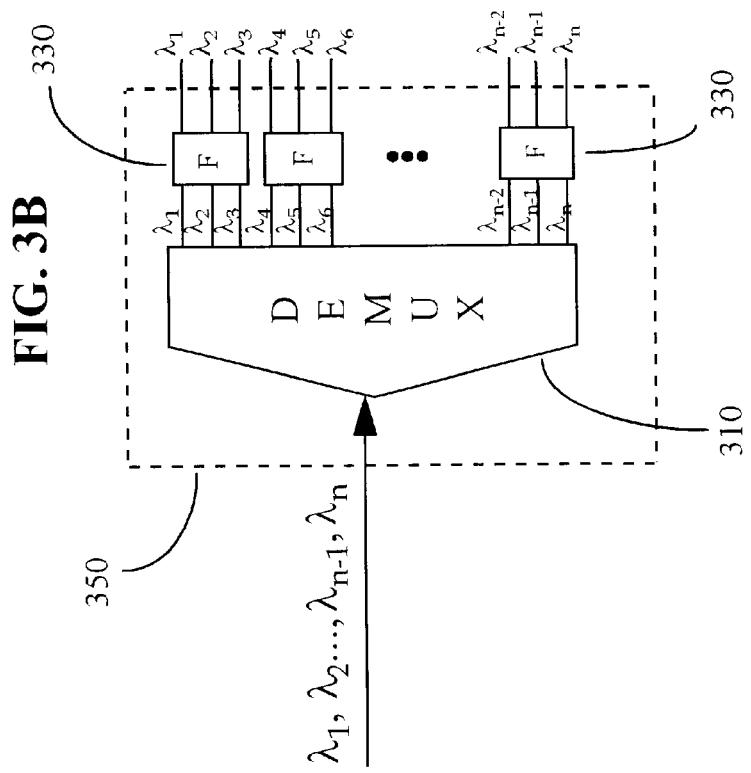
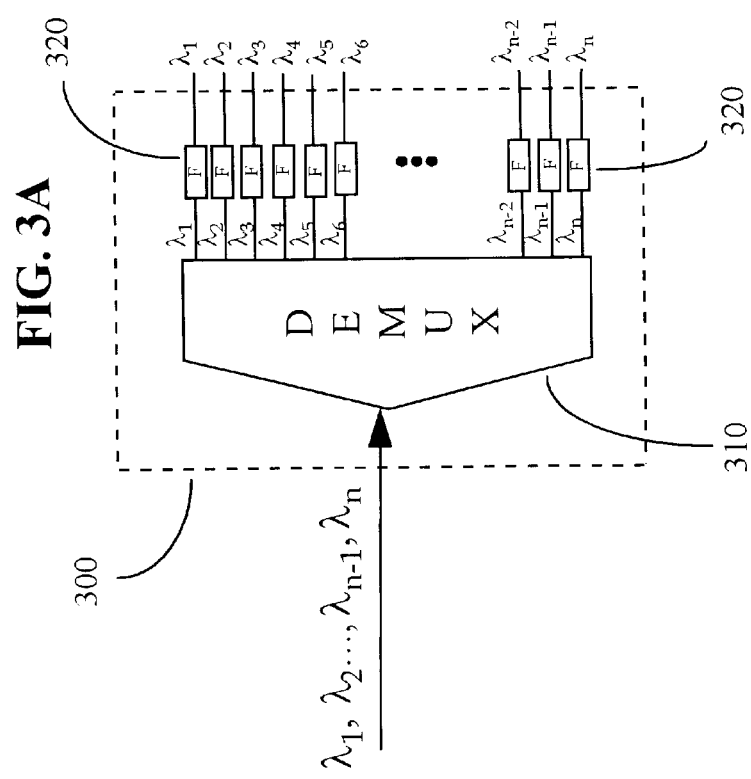

SCALABLE OPTICAL DEMULTIPLEXING ARRANGEMENT FOR WIDE BAND DENSE WAVELENGTH DIVISION MULTIPLEXED SYSTEMS

FIELD OF THE INVENTION

This invention relates generally to lightwave communication networks and, more particularly, to optical demultiplexing units used in wide band dense wavelength division multiplexed (DWDM) systems.

BACKGROUND OF THE INVENTION

Wavelength Division Multiplexing (WDM) increases the capacity of lightwave communication systems by multiplexing many optical channels of different wavelengths for transmission as a composite signal in an optical fiber. At present, most WDM systems deployed in communication networks are generally considered to be low capacity systems, e.g., 4, 8, and 16-channel systems. With recent advances in optical networking technology, system manufacturers are now contemplating dense wavelength division multiplexing (DWDM) systems having as many as 80 channels, for example. One technique for increasing the number of channels in a DWDM system is to reduce channel spacing between adjacent channels. For example, 50 Ghz channel spacing may be used to pack more channels in a DWDM system as compared with the more conventional 100 Ghz channel spacing.

Optical demultiplexers are generally used in WDM systems for demultiplexing a multi-wavelength composite signal into individual optical channels of different wavelengths. One example of an optical demultiplexer is a waveguide grating router described in U.S. Pat. No. 5,002,350 issued to Dragone on Mar. 26, 1991. In general, waveguide grating routers and other types of optical demultiplexers used in existing WDM systems are not well-equipped for meeting the technological demands of DWDM systems that have a large number of closely-spaced optical channels.

Some of the problems associated with demultiplexing channels in a DWDM system include increased crosstalk, larger device size requirements, larger free spectral range (FSR), and random power divergence in the optical channels. More specifically, total system crosstalk increases as a function of the number of channels in the DWDM system. The increase in crosstalk is mainly attributable to the increased crosstalk contribution from non-adjacent channels. For example, crosstalk experienced in one of the channels of an 8-channel system is a function of crosstalk from two adjacent channels as well as crosstalk contribution from 5 non-adjacent channels. By contrast, crosstalk experienced in one of the channels of an 80-channel system is a function of crosstalk from two adjacent channels as well as crosstalk contribution from 77 non-adjacent channels. Consequently, the increased number of non-adjacent channels will dominate the total crosstalk in DWDM systems.

Crosstalk in optical demultiplexers is also sensitive to power divergence among the optical channels. In general, power divergence in lower capacity systems, e.g., 8-channels, can be compensated more easily than the random power divergence found in higher capacity DWDM systems, e.g., 80-channels, where gain flattening schemes are used. Another problem to overcome for optical demultiplexers in DWDM systems is the larger device size needed to accommodate the additional channels. At present, device size is limited by current technologies, such as filter technologies and the like. To support the large number of channels in DWDM systems, optical demultiplexers also require a larger free spectral range (FSR) than that provided in existing devices.

SUMMARY OF THE INVENTION

Substantial reduction in crosstalk and improved scalability for supporting high channel counts in dense wavelength division multiplexed (DWDM) systems is achieved according to the principles of the invention in an optical demultiplexer arrangement that partitions the total number of input optical channels into separate demultiplexer modules, demultiplexes smaller groups of optical channels in the separate demultiplexer modules, and filters the individual optical channels at the outputs of the separate demultiplexer modules. Partitioning the total number of channels into smaller demultiplexing groups and post-filtering a reduced number of demultipexed optical channels reduces the number of non-adjacent channels that can contribute to the total crosstalk level. Accordingly, crosstalk is substantially reduced as compared with prior arrangements. Furthermore, the modularity of the optical demultiplexer arrangement results in smaller device footprints and smaller free spectral ranges associated with the demultiplexer modules. This modularity also allows for future system upgrades without redesign and without disruption to existing service.

In one illustrative embodiment, the optical demultiplexer arrangement includes a splitter or filter for directing the multi-wavelength input optical signal to at least two demultiplexer modules. Each of the demultiplexer modules can be a waveguide grating router or other suitable optical demultiplexer which separates a received multi-wavelength optical signal into individual wavelength channels. The individual wavelength channels are then supplied to bandpass post-filters which are coupled to each of the outputs of the demultiplexer modules. In one embodiment, a separate filter corresponds to each of the outputs. In another embodiment, a filter may be coupled to a plurality of outputs to receive and filter more than one wavelength channel.

BRIEF DESCRIPTION OF THE DRAWING

A more complete understanding of the principles of the invention may be obtained from consideration of the following detailed description in conjunction with the drawing, with like elements referenced with like references, in which:

FIGS. 3A and 3B show illustrative embodiments of the demultiplexer and filter modules according to the principles of the invention;

DETAILED DESCRIPTION OF THE INVENTION

Figure 1:
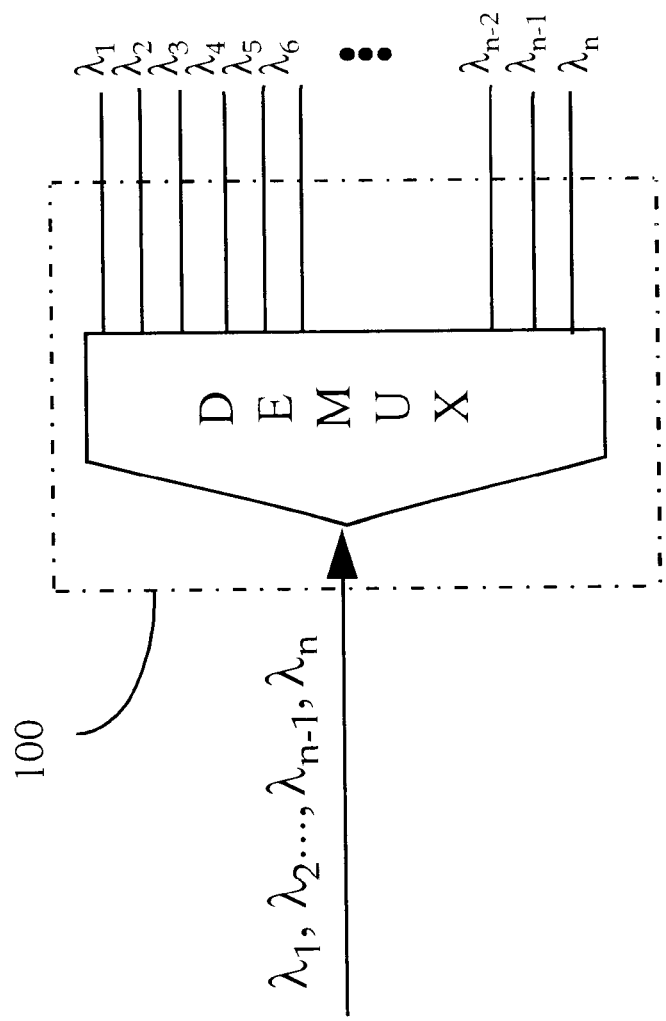
FIG. 1 shows a typical n-channel optical demultiplexer unit.

FIG. 1 shows a typical n-channel optical demultiplexer unit 100 that receives a composite multi-wavelength optical signal and separates the composite signal into individual optical channels of different wavelengths, e.g., $\lambda_1, \lambda_2, \ldots \lambda_{n-1}, \lambda_n$. As previously indicated, optical demultiplexers in the prior art, such as waveguide grating routers, are not well-suited for wide band DWDM systems having a high number of closely-spaced channels.

Figure 2:
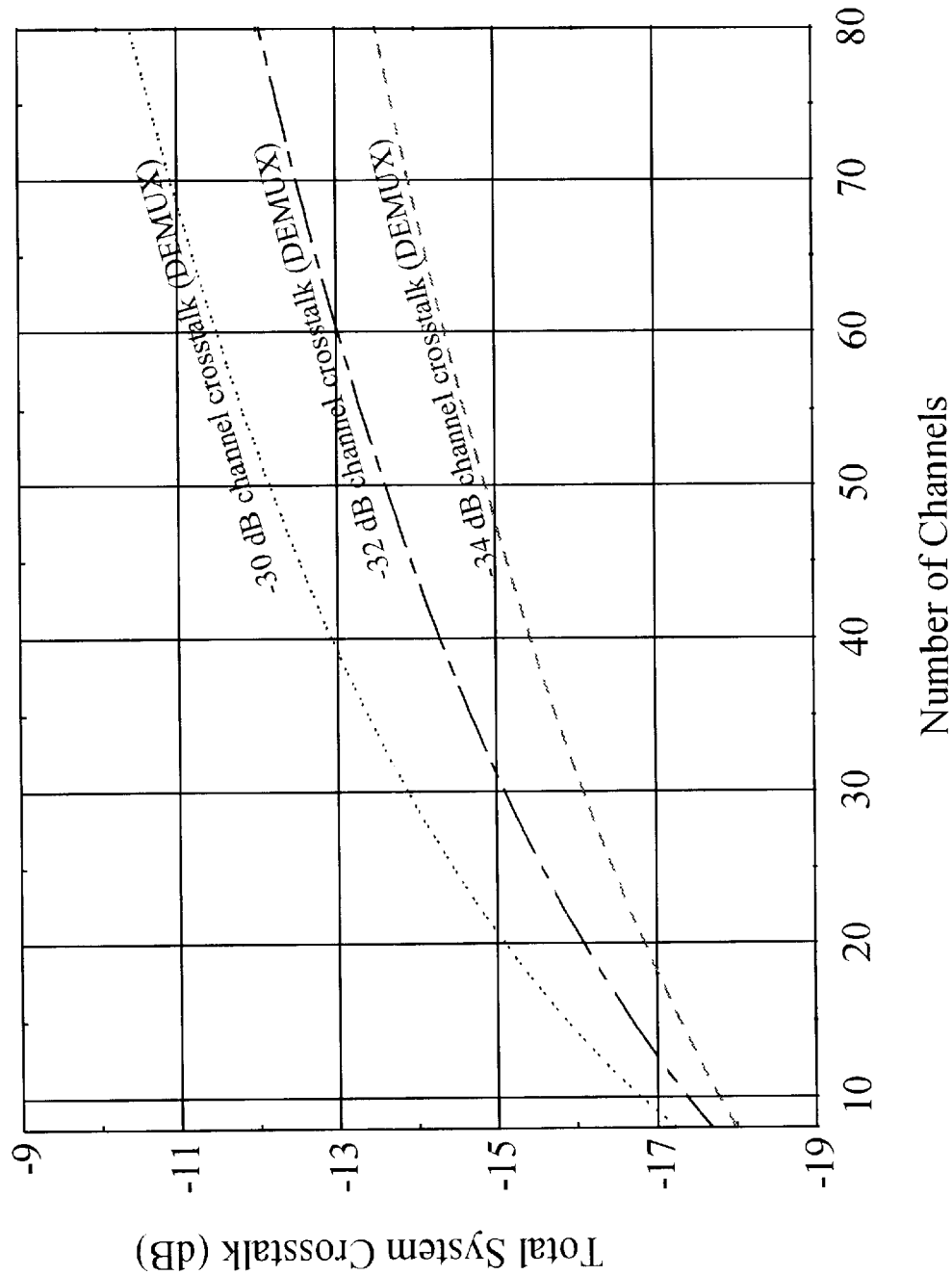
FIG. 2 is a graph that illustrates one example of a relationship between total crosstalk and the number of channels in a WDM system.

In FIG. 2, total crosstalk is shown as a function of the number of channels in a WDM system. In particular, FIG. 2 illustrates how crosstalk will typically have a greater impact on DWDM systems having high channel counts, such as 80-channel systems, for example. It should be noted that FIG. 2 represents the ideal case of no spectral power divergence which will be described in more detail below. More specifically, FIG. 2 shows three exemplary curves of total system crosstalk as a function of the number of channels, wherein each curve is associated with a demultiplexer having a different channel crosstalk level design, e.g., −30 dB, −32 dB, and −34 dB. As shown, the total system crosstalk increases as the number of channels increases. Moreover, total system crosstalk degrades more rapidly with a lower demultiplexer channel crosstalk level, as evidenced by the fact that the separation between the three curves becomes larger as the number of channels increases. This effect is attributable to the increased contribution of crosstalk from non-adjacent channels.

FIG. 3A shows one illustrative embodiment of a demultiplexer module and associated bandpass post-filter modules according to the principles of the invention. More specifically, demultiplexer and filter portion 300 includes a demultiplexer module 310 and a plurality of bandpass post-filters 320, wherein one bandpass post-filter is coupled to each of the output ports of demultiplexer module 310.

As shown, demultiplexer module 310 receives a composite multi-wavelength optical signal as input and demultiplexes the composite signal into its constituent optical channels, wherein each optical channel is associated with a particular wavelength, e.g., $\lambda_1, \lambda_2, \ldots \lambda_{n-1}, \lambda_n$. Various types of optical demultiplexers and the operation thereof are well-known to those skilled in the art and are contemplated for use with the present invention. For example, a waveguide grating router described in U.S. Pat. No. 5,002,350 issued to Dragone on Mar. 26, 1991, which is herein incorporated by reference, may be used in one exemplary embodiment of the invention.

Demultiplexer module 310 supplies the individual optical channels to corresponding bandpass post-filters 320. Choice of an appropriate bandpass post-filter will be apparent to those skilled in the art. For example, bandpass post-filter 320 could be a thin-film filter, transmission grating filter, and so on. As will be described below in more detail, bandpass post-filters 320 are coupled to each output port of demultiplexer module 310 to reduce the total crosstalk contributed from the adjacent and non-adjacent channels and to eliminate interference caused by the free spectral range periodicity associated with demultiplexer module 310.

FIG. 3B shows another illustrative embodiment of the demultiplexer and filter modules according to the principles of the invention. More specifically, demultiplexer and filter portion 350 includes demultiplexer module 310 and a plurality of bandpass post-filters 320, wherein each bandpass post-filter 320 is coupled to three output ports of demultiplexer module 310 for receiving and filtering the three corresponding optical channels. All other aspects of demultiplexer and filter portion 350 are similar to those previously described for demultiplexer and filter portion 310 (FIG. 3A).

It should be noted that the embodiment shown in FIG. 3B is only meant to be illustrative and not limiting. For example, bandpass post-filters 320 may be designed to filter less than three or more than three optical channels. By using bandpass post-filters 320 that filter more than one optical channel of a particular wavelength, the optical demultiplexer arrangement according to the principles of the invention can be appropriately designed for cost or other performance considerations. For example, while optimum crosstalk suppression may be achieved when each bandpass post-filter covers only one output port of a demultiplexer module, a large number of bandpass post-filters would be required for this embodiment.

Figure 4:
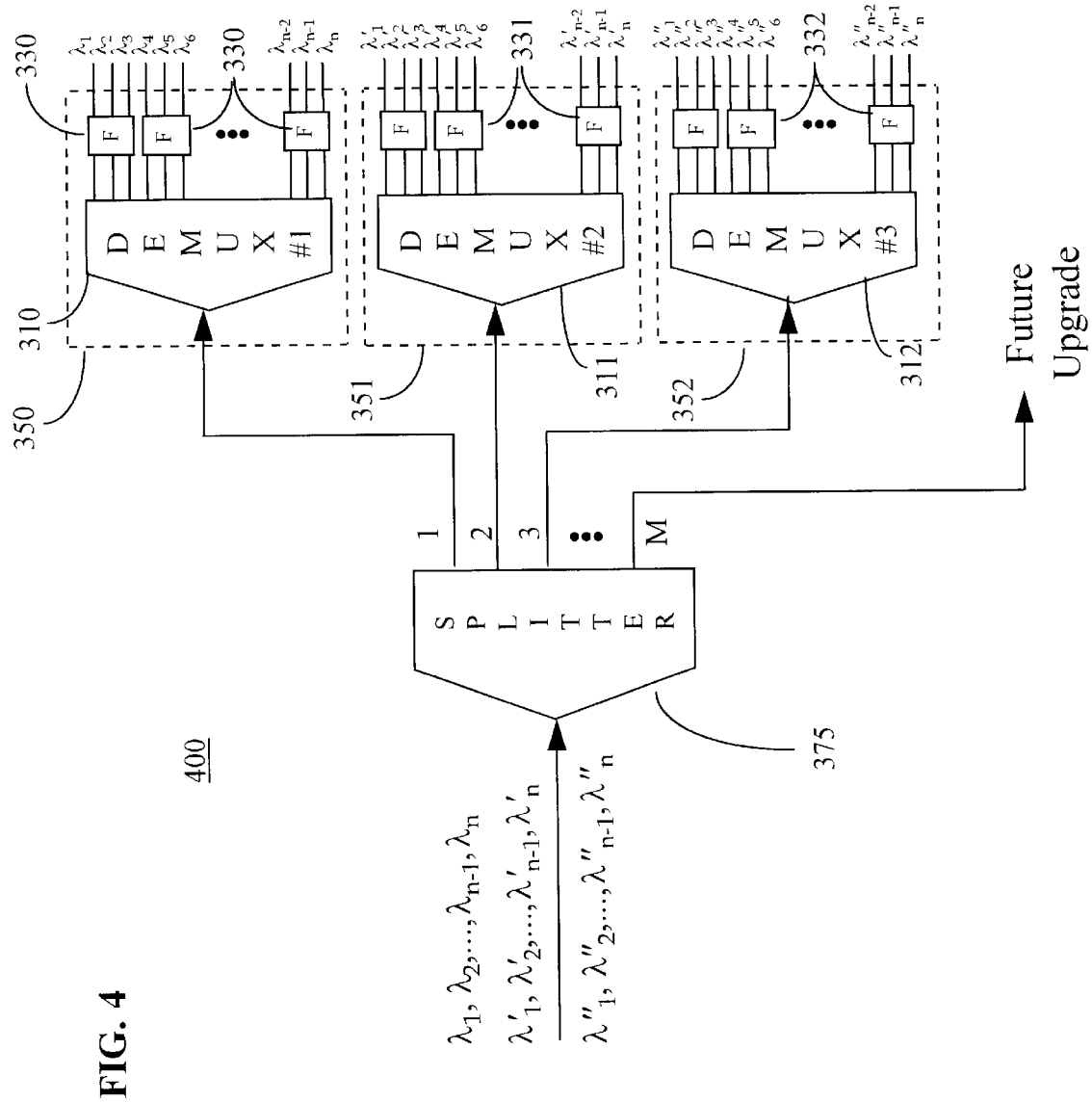
FIG. 4 shows an illustrative embodiment of the scalable optical demultiplexer arrangement according to the principles of the invention.

FIG. 4 shows an illustrative embodiment of the scalable optical demultiplexer arrangement according to the principles of the invention. More specifically, optical demultiplexer arrangement 400 includes an optical router device 375 for distributing the wavelength division multiplexed optical signal among a plurality of output ports. In particular, optical router device 375 receives the multi-wavelength signals having optical channels of particular wavelengths, represented here as wavelengths $\lambda_1, \lambda_2, \ldots \lambda_{n-1}, \lambda_n$, wavelengths $\lambda'_1, \lambda'_2, \ldots \lambda'_{n-1}, \lambda'_n$ and wavelengths $\lambda''_1, \lambda''_2, \ldots \lambda''_{n-1}, \lambda''_n$. Optical router 375 includes M output ports coupled to corresponding demultiplexer and filter portions 350–352. More specifically, the output ports of optical router 375 are coupled to demultiplexer modules 310–312. Demultiplexer modules 310–312 include a plurality of output ports which are coupled to corresponding bandpass post-filters 330–332.

In operation, demultiplexer modules 310–312 separate the composite signals into constituent optical channels each having a particular wavelength. For example, demultiplexer 310 separates optical channels corresponding to wavelengths $\lambda_1, \lambda_2, \ldots \lambda_{n-1}, \lambda_n$, demultiplexer 311 separates optical channels corresponding to wavelengths $\lambda'_1, \lambda'_2, \ldots \lambda'_{n-1}, \lambda'_n$, demultiplexer 312 separates optical channels corresponding to wavelengths $\lambda''_1, \lambda''_2, \ldots \lambda''_{n-1}, \lambda''_n$. Bandpass post-filters 330–332 are configured as previously described in FIG. 3B, whereby each post-filter 330–332 is coupled to a plurality of output ports at demultiplexers 310–312. As shown, post-filters 330 associated with demultiplexer 310 are coupled to three output ports of demultiplexer 310 for receiving and filtering three demultiplexed optical channels supplied by demultiplexer 310. Post-filters 331–332 operate in a similar manner. Individual optical channels having wavelengths $\lambda_1, \lambda_2, \ldots \lambda_{n-1}, \lambda_n$ are supplied as output from filters 330, optical channels having wavelengths $\lambda'_1, \lambda'_2, \ldots \lambda'_{n-1}, \lambda'_n$ are supplied as output from filters 331, and optical channels having wavelengths $\lambda''_1, \lambda''_2, \ldots \lambda''_{n-1}, \lambda''_n$ are supplied as output from filters 332.

Choice of an appropriate optical router device 375 for distributing the optical signals will be apparent to those skilled in the art. For example, optical router device 375 could be an M-port power splitter or an M-port WDM band filter, where M corresponds to the total number of output ports for coupling to demultiplexer modules 350–352 and demultiplexer modules (not shown) that may be added later as part of a system upgrade. If an M-port splitter or equivalent device is used, the bandpass post-filters can provide the necessary "wavelength clean-up", i.e., filtering out unwanted wavelengths, which will be described in more detail below. Moreover, guard bands are not required when using an M-port splitter and, as a result, a continuous wide wavelength band can be achieved. Alternatively, if an M-port WDM band filter or equivalent device is used, guard bands will be required based on the bandpass filter technology. Consequently, the wide wavelength band is discontinuous.

FIG. 4 illustrates an important aspect of the invention, that being the modularity and scalability of optical demultiplexer arrangement 400. In particular, optical demultiplexer arrangement 400 accommodates future system upgrades, e.g., the addition of demultiplexer modules and post-filters to accommodate additional optical channels, without the need for redesign or disruption in existing service. Because the total number of channels of the DWDM system is partitioned into several demultiplexer modules and then post-filtered, the low crosstalk levels achieved in the optical demultiplexer arrangement according to the principles of the invention are independent of system growth. In particular, partitioning the total number of channels into smaller groups for demultiplexing and reducing the number of channels located within the bandpass of the post-filter reduces the number of non-adjacent channels that can contribute to the crosstalk level. For example, only channels within the post-filter bandwidth will dominate the crosstalk. Also, as will be described below in more detail, each demultiplexer module will have a smaller free spectral range to cover a subset of the total number of channels as compared with the large free spectral range if the demultiplexing function was not partitioned.

The scalability of the optical demultiplexer arrangement is also significant in that individual components, e.g., individual demultiplexer modules, post-filter packs, etc., can be physically smaller and less costly than would be the case in a single optical demultiplexer device. For example, demultiplexing 80 channels in a single optical demultiplexer would require a large device size that is not feasible given current fabrication technologies, such as silicon optical bench (i.e., silica-on-silicon).

Figure 5:
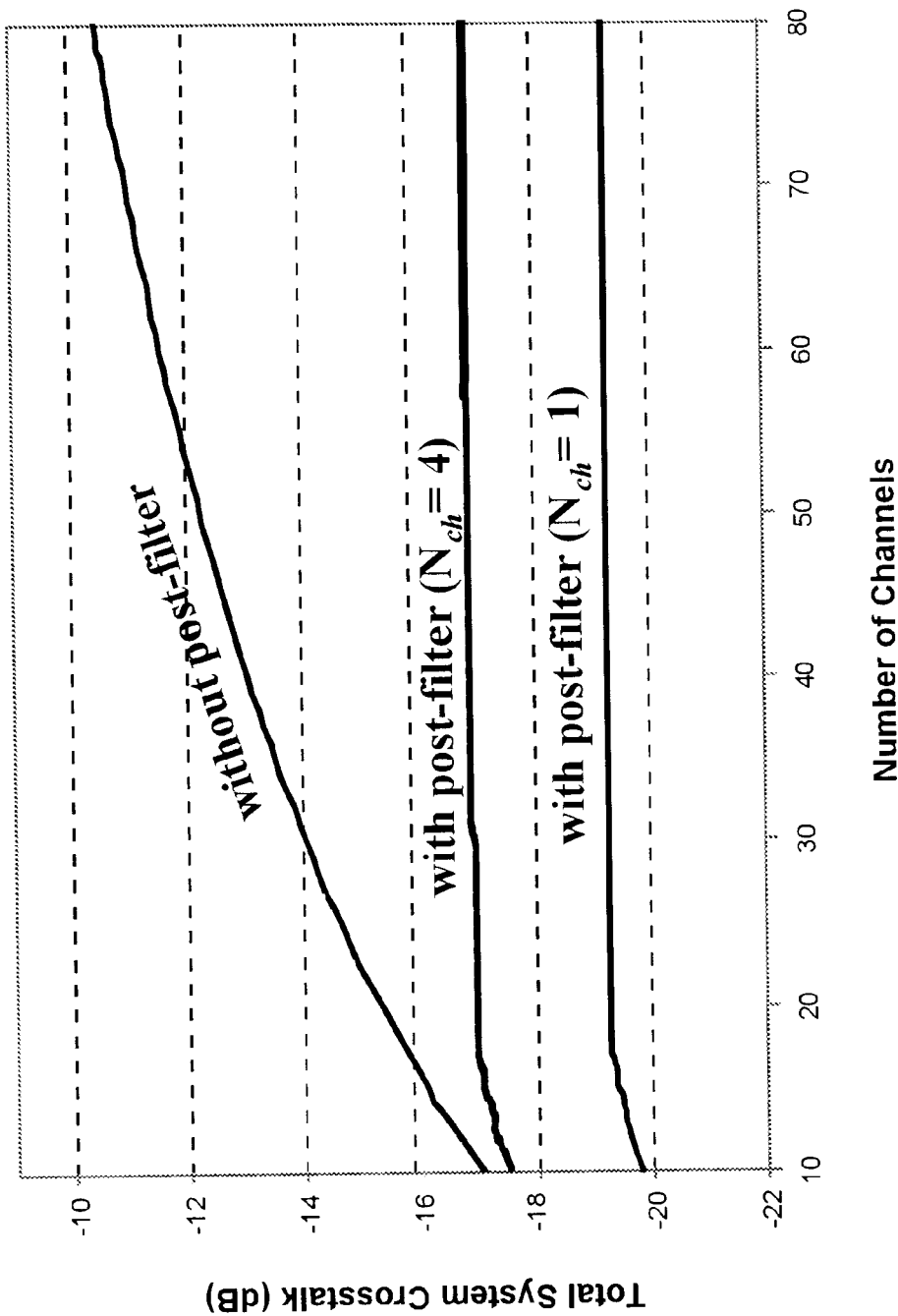
FIG. 5 is a graph that illustrates the reduction in crosstalk achieved according to the principles of the invention as a function of the number of channels in the DWDM system.

FIG. 5 shows three exemplary curves of total system crosstalk as a function of the number of channels in accordance with the principles of the invention. Two of the curves reflect the reduction of total system crosstalk that could be achieved with an optical demultiplexer arrangement that incorporates bandpass post-filters. The remaining curve shows total system crosstalk for an embodiment without bandpass post-filters is provided for comparison purposes. $N_{ch}$ denotes the number of demultiplexer ports coupled to the bandpass post-filters and, consequently, the number of wavelength channels to be filtered by each bandpass post-filter. As such, the curve corresponding to $N_{ch}=4$ represents the reduction of crosstalk levels that can be achieved with an optical demultiplexer arrangement that includes bandpass post-filters coupled to multiple demultiplexer ports as described in FIG. 3B and FIG. 4, while the curve corresponding to $N_{ch}=1$ represents the one-to-one filter implementation described in FIG. 3A. In all cases shown in FIG. 5, the demultiplexer modules were assumed to have a channel crosstalk level design of −30 dB.

In general, the selection of filter bandwidth, $BW_f$, for the bandpass post-filters is based on the number of optical channels to be filtered by the bandpass post-filter as well as the bandpass filter technology selected for implementation. In general, filter bandwidth $BW_f$ should be in the range $\Delta f < BW_f < N_{ch} \cdot \Delta f$, where $\Delta f$ denotes the channel spacing between optical channels in the DWDM system and $N_{ch}$ denotes the number of optical channels supplied to the bandpass post-filter.

FIG. 5 also illustrates another important aspect of the optical demultiplexer arrangement according to the principles of the invention. In particular, FIG. 5 illustrates that total system crosstalk is substantially independent from channel number growth, i.e., increasing the number of channels in the DWDM system. As shown for the curve representing no filtering, total system crosstalk is similar to that shown in FIG. 2. However, the total system crosstalk achieved with post-filtering according to the principles of the invention is maintained at a relatively constant level. This feature is attributable to the fact that total system crosstalk is dominated by a smaller number of channels, e.g., only those within the passband of the post-filters, as a result of the partitioning and subsequent post-filtering according to the principles of the invention. Accordingly, this feature allows for system growth without requiring redesign of the optical demultiplexer arrangement and without discarding existing equipment or disrupting existing service.

Figure 6:
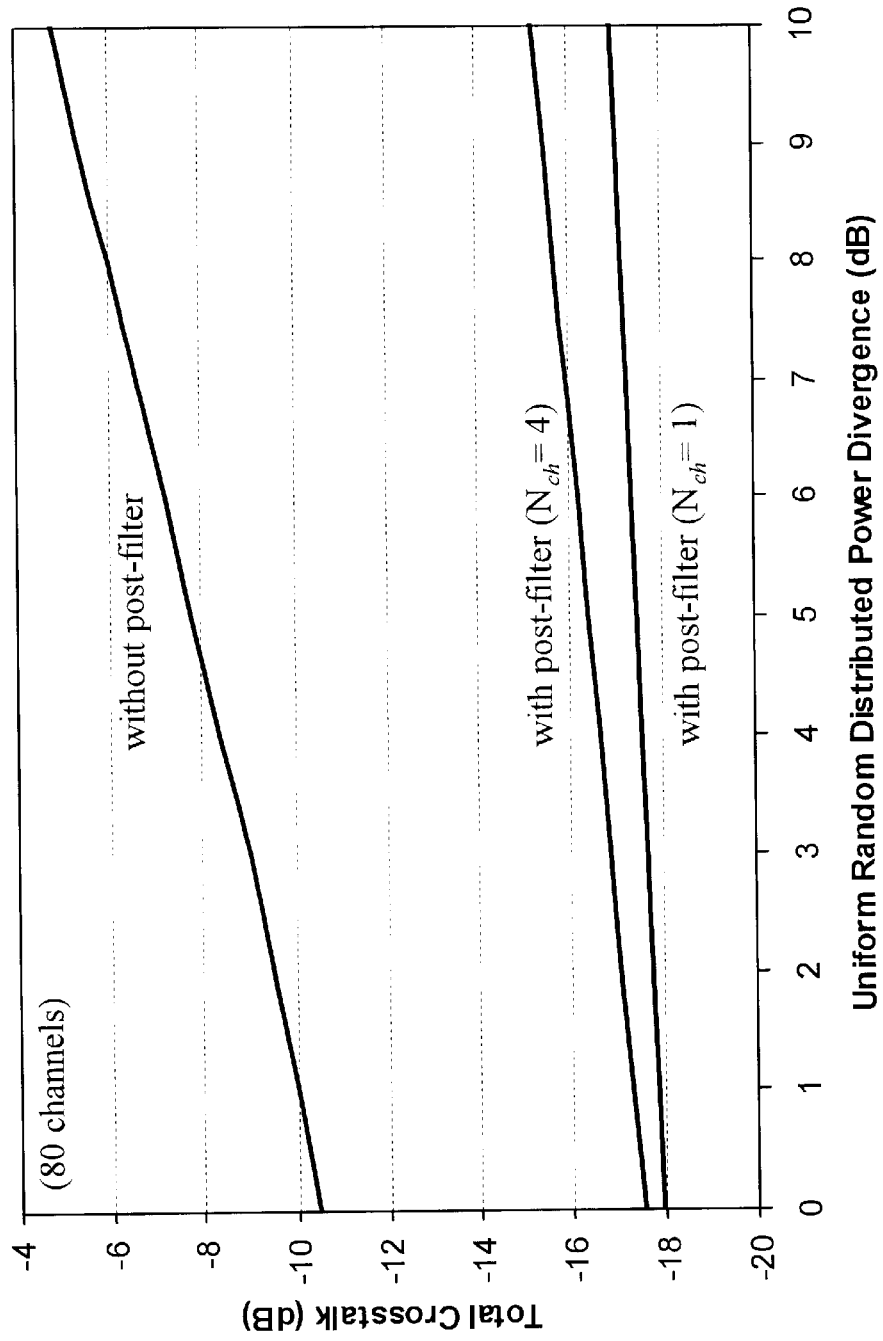
FIG. 6 is a graph that illustrates one example of crosstalk levels as a function of power divergence in the optical channels according to the principles of the invention.

FIG. 6 illustrates the effect of power divergence among optical channels on the total system crosstalk levels. In particular, the preceding discussion assumed no power divergence or a relatively fixed power divergence profile that can be compensated by well-known techniques known to those skilled in the art, such as with gain flattening filters and in-line optical variable attenuators. In practice, crosstalk levels are sensitive to the power divergence among the channels. In particular, channel power divergence can be caused by several factors, such as amplifier gain flatness, scattering losses, fiber losses, and the like, all of which may not be compensated completely. The effect of power divergence on crosstalk levels depends on the amplitude and shape of the channel power divergence. Moreover, the effect of power divergence can be more problematic for DWDM systems having a high channel count. As such, existing optical demultiplexers are not optimally designed with this consideration in mind.

For purposes of this discussion, it is assumed that power variation among the channels can at least be partially compensated with gain flattening and attenuation techniques and that any uncompensated power variation will follow uniform or Gaussian random distribution. Uncompensated power variation with uniform random distribution is a reasonable assumption given that optical monitoring technology and optical variable attenuator technology can be used to correct the power divergence to the first order in a large scale DWDM system.

FIG. 6 shows the total system crosstalk as a function of the uniform random distributed power divergence in an 80-channel DWDM system according to the principles of the invention. In particular, the plot corresponding to no filtering shows higher crosstalk levels as the power divergence increases. By contrast, post-filtering according to the principles of the invention achieves much lower crosstalk levels which are less sensitive to increased power divergence among the channels, especially where a random power divergence profile exists. Again, this feature of the invention is attributable to the partitioning and subsequent post-filtering of a smaller number of channels, e.g., only those within the passband of the post-filters, according to the principles of the invention.

According to another aspect of the invention, the optical demultiplexer arrangement can substantially eliminate interference caused by the free spectral range periodicity associated with demultiplexer modules, such as waveguide grating routers. In particular, because the total number of channels is partitioned and demultiplexed by separate demultiplexer modules, the free spectral range periodicity associated with each of the separate demultiplexer modules becomes a consideration. For example, the periodicity can create interference at the output ports of the demultiplexer modules, e.g., output ports may include the desired wavelength channel as well as the wavelength channels separated by an integral number of free spectral ranges from the desired wavelength channel.

Figure 7:
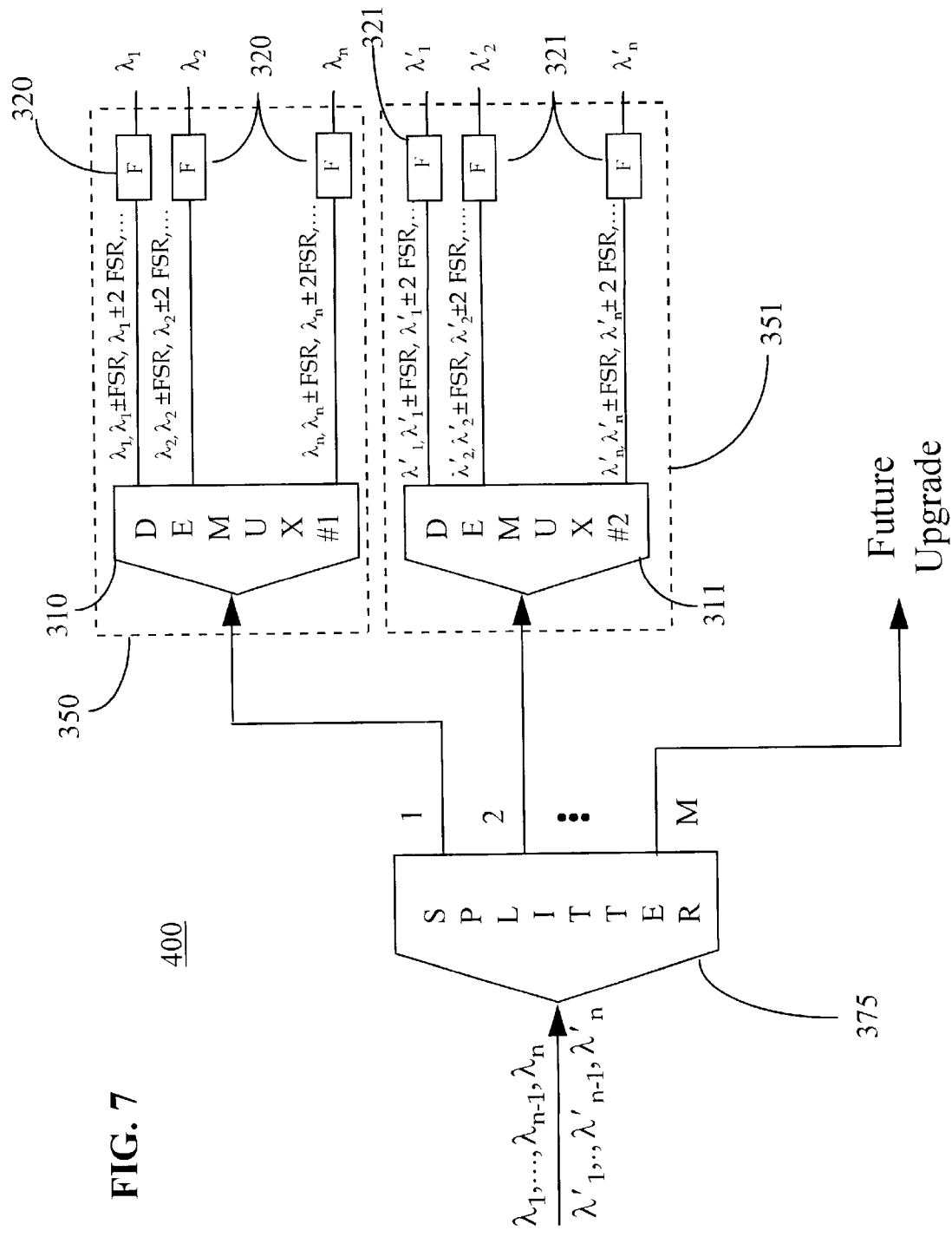
FIG. 7 is a simplified representation of the spectra of optical channels processed in accordance with the principles of the invention; and"

More specifically, as shown in FIG. 7, partitioning the total number of channels into smaller groups of channels allows for demultiplexers 310–311 to be implemented with smaller device sizes and smaller free spectral ranges. However, the smaller free spectral ranges of the demultiplexers results in wavelengths outside of the free spectral range (e.g., $\lambda_i \pm m$ FSR, where m is an integer and m≠0) being routed to the same output ports of demultiplexers 310 and 311. In other words, wavelengths at the other grating orders would exit from the same output ports of each demultiplexer. For example, the first output port of demultiplexer 310 would have $\lambda_1, \lambda_1 \pm$FSR, $\lambda_1 \pm 2$ FSR, and so on. However, post-filters 320 and 321 effectively eliminate this type of interference by filtering out the unwanted wavelengths. As shown, post-filter 320 associated with the first output port of demultiplexer 310 filters out $\lambda_1 \pm$FSR, $\lambda_1 \pm 2$ FSR, and so on, so that only $\lambda_1$ remains.

Figure 8:
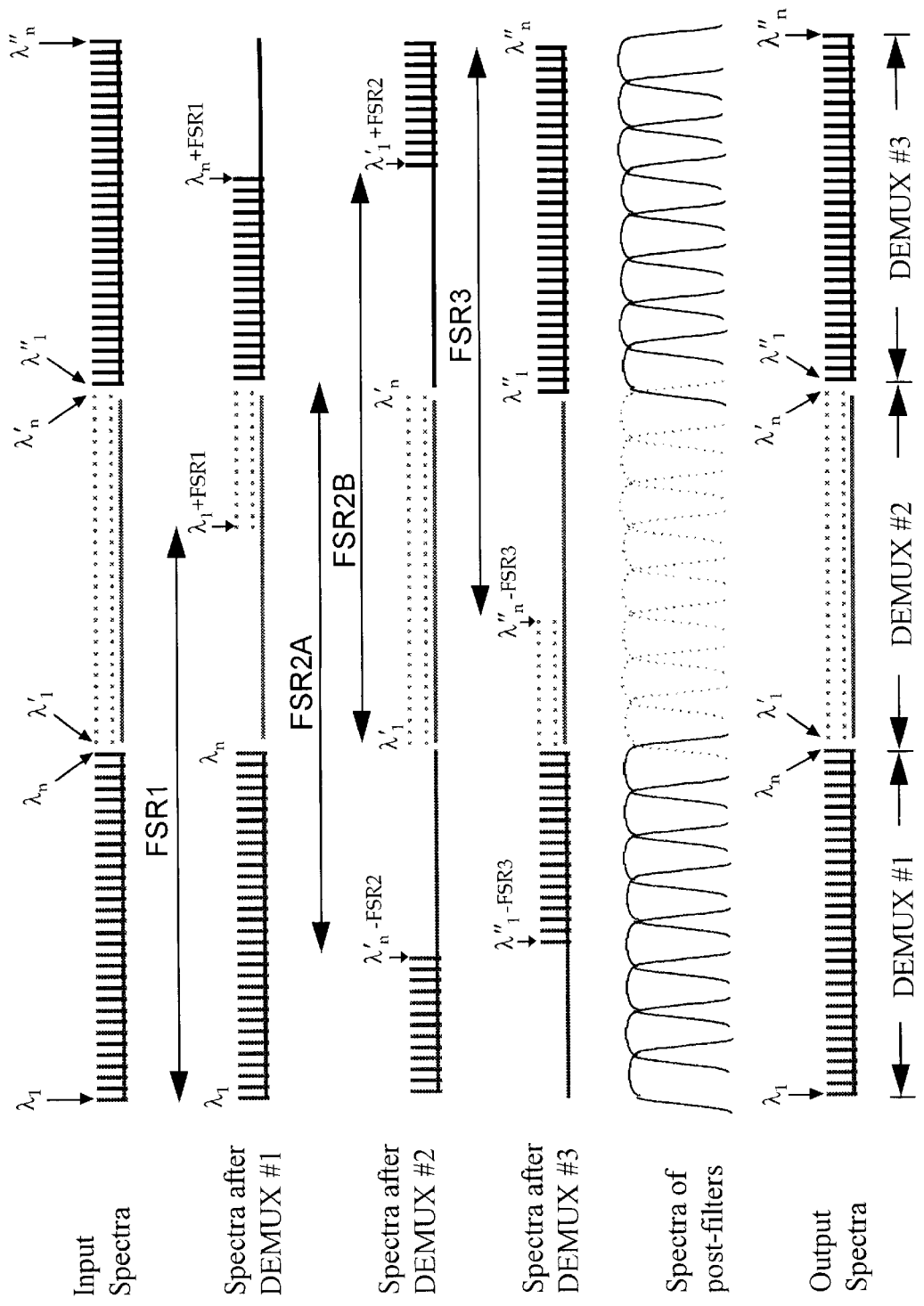
FIG. 8 shows an illustrative embodiment of the scalable optical demultiplexer arrangement according to the principles of the invention showing the filtering of corresponding wavelengths from other free spectral ranges.

FIG. 8 is a simplified representation of how post-filtering according to the principles of the invention can filter wavelengths outside of the free spectral range of the demultiplexer. Briefly, the "spectra after DEMUX#1" shows how wavelengths beyond the free spectral range of DEMUX#1 may interfere with channels within the free spectral range of DEMUX#1. Free spectral range FSR1 is shown to extend beyond the input wavelength band for DEMUX#1 because of the fact that only a portion of the free spectral range represents usable bandwidth. As shown by the "spectra of post-filters", the post-filters corresponding to DEMUX#1 are designed to filter wavelengths that are outside of the usable bandwidth of DEMUX#1. Consequently, the "output spectra of DEMUX#1" only includes those desired wavelengths from the input spectra of DEMUX#1. The same principles apply to DEMUX#2 and DEMUX#3. FSR2A and FSR2B are only meant to illustrate two possible design choices for the free spectral range of DEMUX#2.

Post-filtering according to the principles of the invention also provides "spectral purification" with regard to other unwanted wavelengths, e.g., other than those described above. For example, the supervisory wavelength channel (e.g., 1510 nm in ITU) that is supplied along with the other optical channels to a respective demultiplexer can be filtered out by the post-filters provided the wavelength is not within the passband of the post-filter. In accordance with another benefit of the post-filtering aspects of the invention, wavelength alignment can be easily achieved and can tolerate temperature variations without the need for temperature control.

In sum, the optical demultiplexer arrangement according to the principles of the invention provides a modular and highly scalable solution for DWDM systems that reduces the total system crosstalk, substantially eliminates interference caused by free spectral range periodicity associated with waveguide grating router demultiplexers, and uses a smaller device footprint which can be implemented with current technologies.

It will be understood that particular embodiments described above are only illustrative of the principles of the present invention, and that various modifications could be made by those skilled in the art without departing from the spirit and scope of the present invention. For example, the optical demultiplexer arrangement according to the principles of the invention may be implemented using various types of optical demultiplexers as the demultiplexer modules and various types of filter technologies for the bandpass post-filters. Moreover, among other applications, the optical demultiplexer arrangement can be used in bidirectional point-to-point DWDM systems as well as add/drop applications. Accordingly, the scope of the invention is limited only by the claims that follow.

What is claimed is:

1. An apparatus for demultiplexing a wavelength division multiplexed optical signal having a plurality of optical channels, the apparatus comprising:

an optical muter for distributing a copy of the wavelength division multiplexed optical signal to each of a plurality of output ports;

two or more optical demultiplexers, each directly coupled to one of the plurality of output ports, each of the two or more demultiplexers being operable to receive the entire wavelength division multiplexed optical signal and further operable to demultiplex a respective group of optical channels such that an optical channel is demultiplexed by only one optical demultiplexer, wherein each of the two or more optical demultiplexers is an arrayed waveguide grating; and a plurality of optical filters coupled to selected output ports of the two or more optical demultiplexers, each of the plurality of optical filters being transmissive with respect to at least one selected wavelength within the respective group of demultiplexed optical channels and reflective with respect to other wavelengths, wherein the optical router includes one or more unused output ports, each of which is capable of being directly coupled to an additional optical demultiplexer adapted for receiving the entire wavelength division multiplexed optical signal and for demultiplexing other optical channels such that additional optical demultiplexers can be added to the arrangement without disrupting operation of the two or more optical demultiplexers, wherein each of the additional optical demultiplexers is an arrayed waveguide grating.

2. The apparatus defined in claim 1, wherein the optical router comprises an M-port optical splitter, where M is an integer corresponding to the number of output ports and has a value greater than 2, wherein each of the M output ports of the optical splitter is capable of supplying the wavelength division multiplexed optical signal to a corresponding optical demultiplexer.

3. The apparatus defined in claim 1, wherein the plurality of optical filters are coupled to the selected output ports of the two or more optical demultiplexers in a one-to-one corresponding relationship so that each of the plurality of optical filters is transmissive with respect to only one wavelength and reflective with respect to all other wavelengths.

4. The apparatus defined in claim 1, wherein each of the plurality of optical filters is coupled to a predetermined number of the selected output ports of the two or more optical demultiplexers, and wherein each of the plurality of optical filters is transmissive with respect to a predetermined number of wavelengths and reflective with respect to other wavelengths, wherein the predetermined number of the selected output ports and the predetermined number of wavelengths is at least 2.

5. The apparatus defined in claim 4, wherein the predetermined number of selected output ports and the predetermined number of wavelengths is three.

6. The apparatus defined in claim 4, wherein the predetermined number of selected output ports and the predetermined number of wavelengths is four.

7. The apparatus defined in claim 1, wherein the plurality of optical filters comprises filters selected from the group consisting of thin-film filters and transmission grating filters.

8. The apparatus defined in claim 1, wherein crosstalk for a given optical channel in a particular subset of optical channels is a function of crosstalk contribution from adjacent channels and nonadjacent channels in the particular subset of optical channels, wherein the apparatus substantially reduces crosstalk contribution from the non-adjacent channels by filtering only selected ones of the plurality of optical channels in the particular subset of optical channels.

9. The apparatus defined in claim 1, wherein each of the optical demultiplexers has a corresponding free spectral range whereby optical channels having wavelengths beyond the free spectral range of an optical demultiplexer are capable of interfering with optical channels having wavelengths within the free spectral range of that optical demultiplexer as a result of free spectral range periodicity, the plurality of optical filters associated with that optical demultiplexer being capable of reducing interference by filtering out the wavelengths beyond the free spectral range of that optical demultiplexer.

10. The apparatus defined in claim 1, wherein selection of filter bandwidth for each of the plurality of optical filters is a function of the number of optical channels to be filtered and the channel spacing between the optical channels.

11. A method of upgrading the demultiplexing capability of a wavelength division multiplexed (WDM) system capable of transporting a WDM optical signal having a plurality of optical channels of different wavelengths, the method comprising:

distributing a copy of a WDM optical signal to each of a plurality of transmission paths via output ports of an optical splitter;

at two or more of the output ports of the optical splitter, receiving the entire WOM optical signal at a respective arrayed waveguide grating (AWG)-based optical demultiplexer and independently demultiplexing selected ones of the plurality of optical channels from the entire WDM optical signal so that an optical channel is demultiplexed in only one of the plurality of transmission paths corresponding to one of the output ports of the optical splitter, wherein each of the respective AWG-based optical demultiplexers is directly coupled to the optical splitter, and filtering each of the demultiplexed optical channels; end at one or more previously unused output ports of the optical splitter, directly coupling an additional AWG-based optical demultiplexer adapted for receiving the entire WDM optical signal and for demultiplexing other optical channels.

* * * * *